Figure 1:
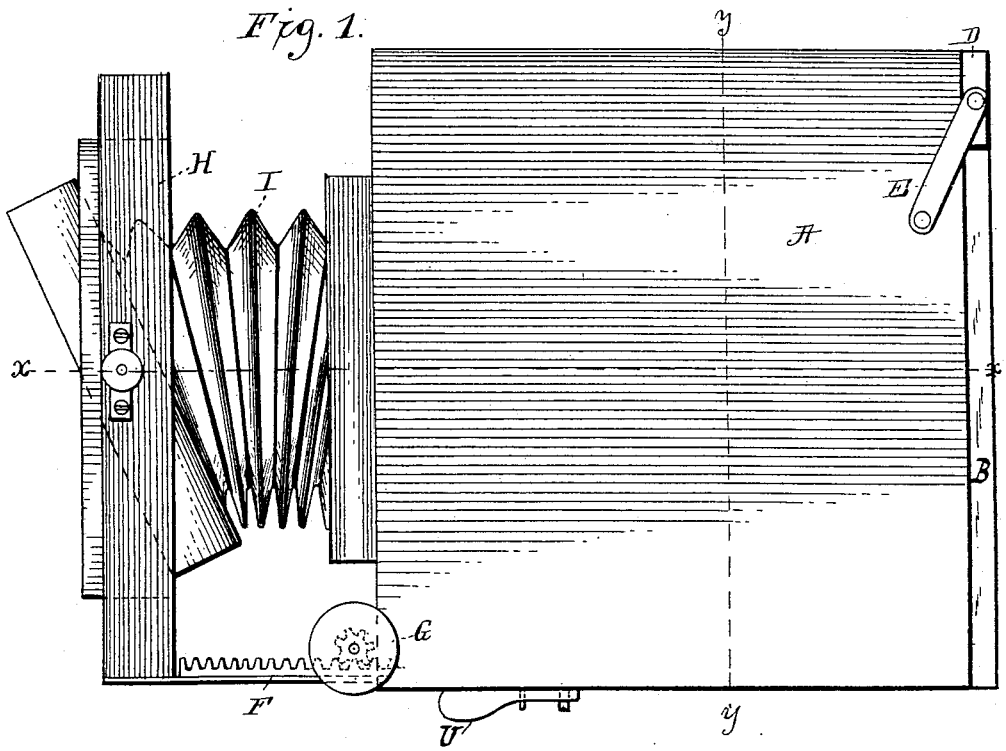

(No Model.) 3 Sheets—Sheet 1.

S. P. HASEY.
PHOTOGRAPHIC CAMERA.

No. 395,899. Patented Jan. 8, 1889.

Witnesses:
W. E. Bowen,
J. Felbel

Inventor
Sydney P. Hasey
by Phillips Abbott
his Attorney.

(No Model.) 3 Sheets—Sheet 2.

S. P. HASEY.
PHOTOGRAPHIC CAMERA.

No. 395,899. Patented Jan. 8, 1889.

Witnesses:
W. E. Bowen,
J. Felbel.

Inventor:
Sydney P. Hasey
by Phillips Abbott
his Attorney (No Model.) 3 Sheets—Sheet 3.

S. P. HASEY.
PHOTOGRAPHIC CAMERA.

No. 395,899. Patented Jan. 8, 1889.

Witnesses:
W. E. Bowen
J. Felbel

Inventor:
Sydney P. Hasey
by Phillips Abbott
his Attorney

UNITED STATES PATENT OFFICE.

SYDNEY P. HASEY, OF NEW YORK, N. Y.

PHOTOGRAPHIC CAMERA.

SPECIFICATION forming part of Letters Patent No. 395,899, dated January 8, 1889.

Application filed June 19, 1888. Serial No. 277,507. (No model.)

*To all whom it may concern:*

Be it known that I, SYDNEY P. HASEY, a citizen of the United States, and a resident of New York city, in the county of New York and State of New York, have invented certain new and useful Improvements in Photographic Cameras, of which the following is a specification.

My invention relates to improvements in photographic cameras, parts of the invention being applicable to detective cameras only and parts being adapted to cameras for long exposures, as well as detective cameras.

The invention consists, first, in the construction and arrangement of parts whereby the camera may be conveniently held in the hand and "aimed," so to speak, at the object to be photographed, whether in motion or not, and so that the camera may follow the object, if in motion, and be focused meantime, and when the proper focus is obtained and the object properly centered in the lens, then, by operating a trigger-like device, the sensitive plate will be instantly located in front of the ground-glass plate, also the instantaneous shutter will be turned from light to dark during the movement of the sensitive plate to its position in front of the ground-glass plate, and then the shutter will be flashed, making the exposure, and again instantly turned to dark and remain then at rest.

The invention consists, second, in a tilting lens-holding frame, whereby the object may be brought more easily into the field.

In the drawings the same reference-letters indicate the same parts in all the figures.

Figure 4:
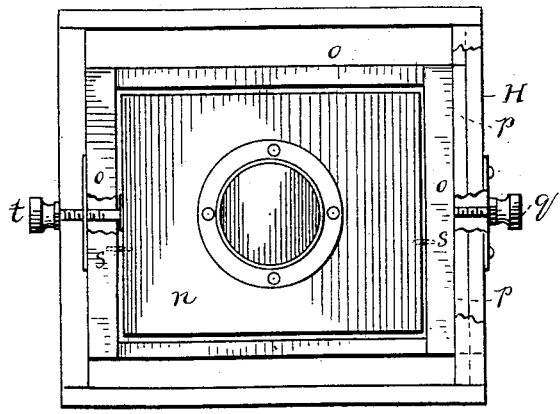
Figure 2:
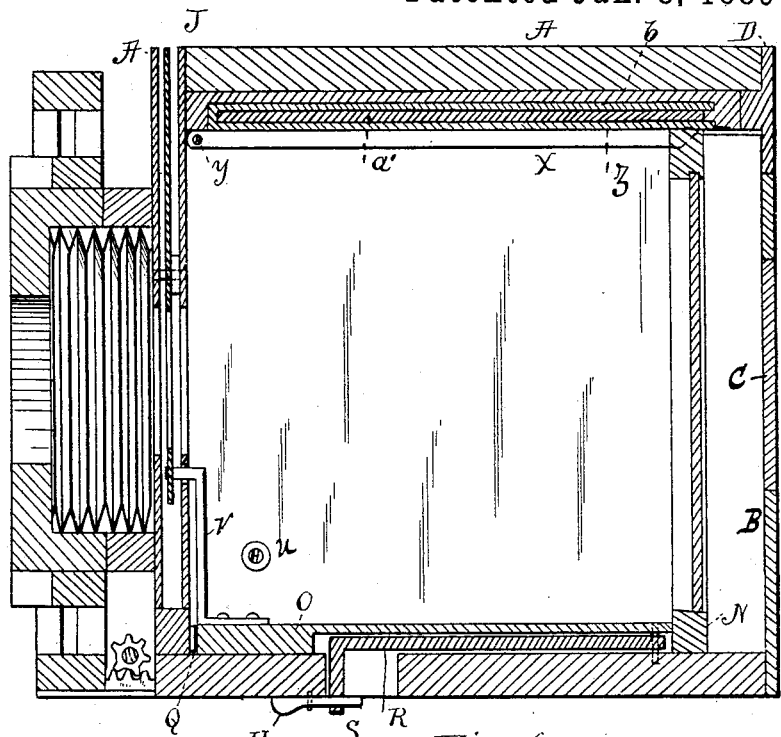
Figure 6:
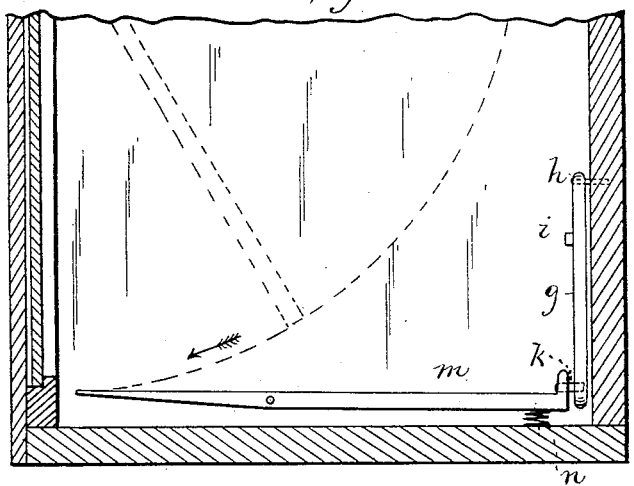
Figure 3:
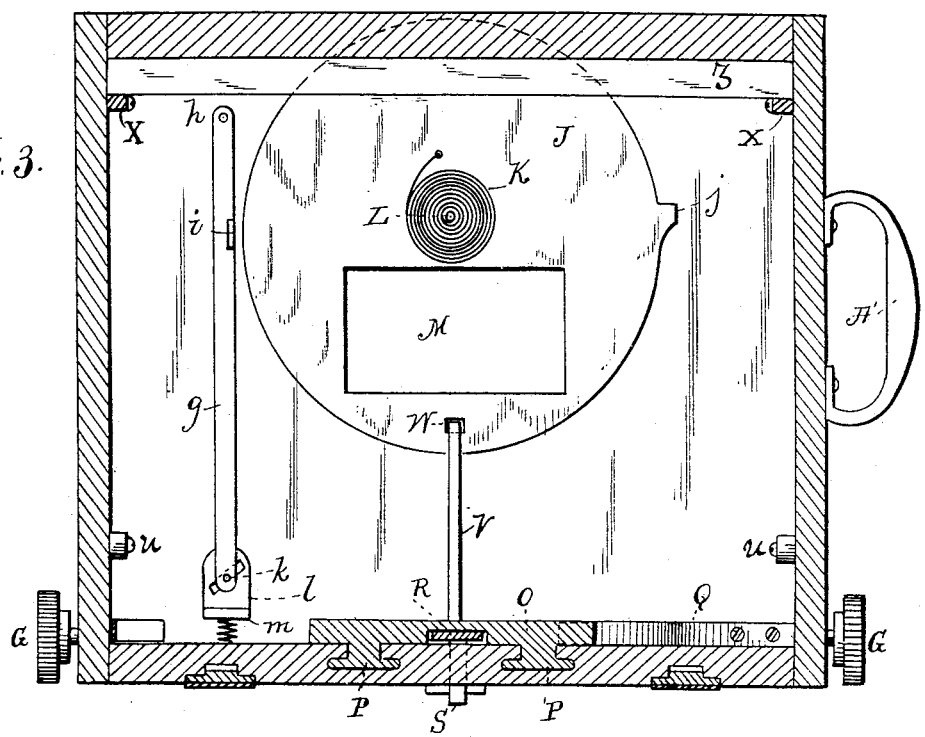
Figure 5:
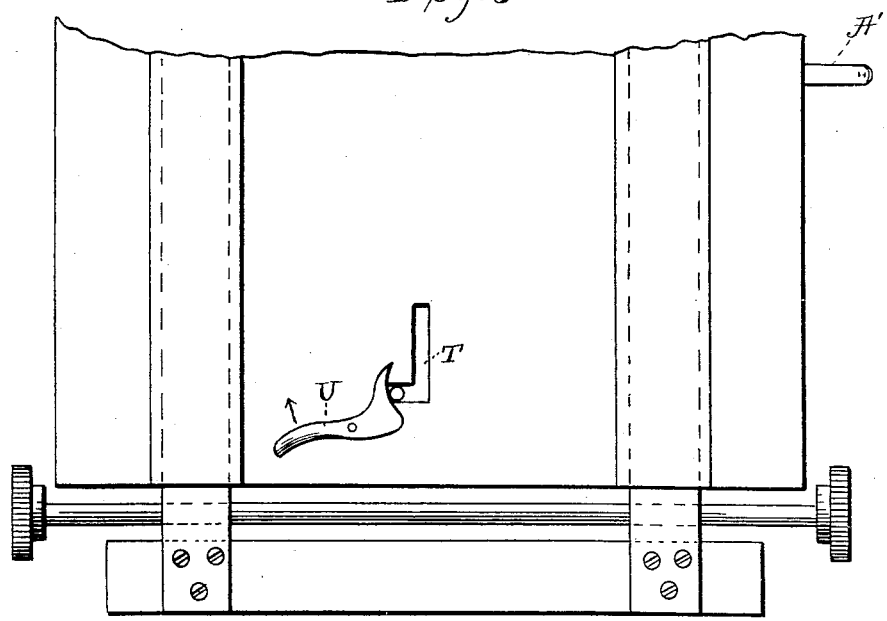

Figure 1 is an elevation of my camera, all the parts being in position. Fig. 2 is a longitudinal vertical section of my camera on the line *x x* of Fig. 1. Fig. 3 is a crosswise vertical section of the camera on the line *y y* of Fig. 1. Fig. 4 is a front view of the tilting lens-holding frame. Fig. 5 is a view of the under side of the camera, showing the trigger. Fig. 6 is a sectional view of the interior of the camera, showing the stop for the shutter and the devices whereby it is operated.

A is a camera-box, made of such material as may be desired. It is provided on one side with a conveniently-located handle, A', whereby it may be firmly held.

B is a movable end piece, as usual, provided with a door, C, through which the focusing can be taken, as usual.

D is a door supported and moving on the arms E, which may be swung downwardly and away from the camera-box for the insertion of the plate-holder.

F is the usual rack and pinion, operated by thumb-screws G, for securing the focus.

H is an outer frame or support for the inner lens-supporting frame, O.

I is the bellows.

J is the usual flash-shutter, operated by the spring K, or in any other desired manner, pivoted at L, and provided with the usual opening, M, which may be of such shape and precise location as preferred.

All the above-recited parts of the apparatus are or may be the same as those now generally in use.

Referring to the interior of the camera, as especially illustrated in Figs. 2, 3, and 6, N is the ground-glass-holding frame. It is mounted on a slide, O, which is supported on suitable ways and slide-strips, P P, (see Fig. 3,) in the bottom of the camera-box.

Q (see Figs. 2 and 3) is a spring fastened at the forward end of the camera-box, the free end of which presses against the front end of the slide O and normally tends to push it and the ground-glass frame rearwardly.

R is a catch which is fastened to the slide O, the end S of which passes downwardly through the bottom of the camera-box in a bayonet-slot joint, T. (Shown in Fig. 5.) The end S of this catch has a slight lateral movement to enable it to pass into the bayonet part of this slot, and is therefore attached to the slide O by a single pivot, as shown.

U is a trigger pivoted to the under side of the camera in such position that it may be easily reached by the fingers operating the thumb-screws G for the purpose of focusing, and it is so arranged with relation to the end of the catch S that when pressed in the direction of the arrow (see Fig. 5) it will force the end of the catch S out of the bayonet part of the slot into the straight part, and then the spring Q, being liberated, pushes the slide and the ground-glass frame rearwardly.

V is a holding device, shown as a bracket-shaped arm, which is attached to the forward end of the slide O, which passes through the front wall of the camera-box and enters the hole W in the shield. This hole is represented as being directly under the opening of the shutter; but it, and also the holding device V, may be located at any other preferred place. The holding device V of course moves rearwardly with the slide O.

X are supports for the sensitive-plate holder. They are pivoted at Y to the sides of the camera-box, and are supported at their other ends by the upper edge of the ground-glass-holding frame when that frame is in its forward position; but they are released and drop when the frame is in its rearmost position.

Z is the plate-holder. It consists of a backed outer frame or case, $a$, provided with forwardly-extending flanges $b$ on all sides to secure a light-tight connection with the hinged cover-like part $c$, which holds the plate $d$. This cover-like part $c$ may be hinged by an ordinary leather or canvas or other preferred hinge, preferably at $e$, to one side of the case $a$, and the plate $a'$ is slid into it from the top when open, and there is a lip-shaped flange, $f$, on three sides of the cover-like part, whereby the plate is held in position. The plate is of course inserted in this holder in the dark room, and the cover-like part is then folded over and snugly pressed into the case $a$. The flanges on the several parts completely exclude light.

Referring now to Figs. 3 and 6, $g$ is a lever pivoted at $h$ and provided with a forwardly-projecting stud, $i$, which is so located and adjusted relative to the flash-shutter J that a tangentially-extending projection, $j$, made on the side of the shutter will strike against this stud $i$ during the revolution of the shutter. At the lower end of the lever $g$ a laterally-extending pin, $k$, enters a slotted plate, $l$, on the end of a pivoted arm, $m$, (see Fig. 6,) which extends to the rear part of the camera, the under side of which, at its rear part, is cut away, so that it may lie snugly down on the bottom of the camera.

$n$ is a small spring, which normally retracts the lever $m$, compelling its forward end to occupy a position near the bottom of the camera. This forward end of the lever may also, as shown, be made much heavier than the rear end, so that gravity, also, will tend to bring it down.

Referring now to Figs. 1 and 4, in these figures I illustrate the tilting-lens-holding frame.

H, as before stated, is a frame which is attached to the rack-bar.

$o$ is an inner frame, which slides in the groove $p$ in the inside uprights of the outer frame, H.

$q$ is a set-screw which, in a manner well known, passes through the outer frame, H, and presses against a plate on the edge of the inner frame, $o$, whereby that frame is held in any desired vertical position.

$r$ is the lens-holding plate or frame. It is pivoted centrally or eccentrically, as at $s$, to the frame $o$. It is shown as pivoted eccentrically in Fig. 4. $t$ is a set-screw, similar to the set-screw $q$, which passes through a projecting portion of the frame $o$ and engages with a plate on the lens plate or frame $r$. By this means it is apparent the lens-holding plate or frame may be tilted and fastened by the set-screw $t$, as may be desired.

The operation is as follows: The door $d$ is swung downwardly to expose the opening in the rear of the camera. The camera is then turned bottom side up, whereby the lens-holding plate-supports X drop to the upper side of the camera-box, and while in this position the ground-glass frame is pushed forward and the end of the catch S is locked into the bayonet-joint part of the slot T. The camera is then turned over again, right side up. The plate-holder Z is then pushed into the camera through the opening left by the removal of the door D, the cover $c$ of the plate-holder being on its under side, and the door is then again closed. The shutter J is then adjusted in any suitable manner—such as by a lever extending through the side of the camera-box (not shown) or in any other preferred manner, many such devices being now well known, so that the holding device V will enter the hole W in the under side of the shutter. The opening M in the shutter will then of course be in line with the lens. The door C in the rear wall, B, of the camera is then opened, and the entire instrument being held by the handle A' in one hand, or otherwise supported, it is focused by the operator in the usual manner. When he finds the object properly focused and centered, he closes the door C and moves the trigger U in the direction of the arrow with his fingers. (See Fig. 5.) (This trigger, it will be noticed, is so located that the third and fourth fingers of the hand which is operating the left-hand thumb-screw may conveniently reach it. Thus no removal of the hand from the thumb-screw to operate the trigger is necessary; but, on the contrary, the trigger may be operated the instant the object is found to be in focus and properly centered.) The trigger forces the end S of the catch R out from the bayonet part of the slot into the straight part. The spring Q then at once pushes the ground-glass plate rearwardly. This withdraws the holding device from the shutter J. The shutter then, actuated by its spring, rotates to the left (see Fig. 3) until the projection $j$ strikes against the stud $i$ on the pivoted lever $g$. The shutter is then arrested for an instant. During that instant the ground-glass frame $n$ has traveled still farther rearwardly and has released the free ends of the plate-supports X. The instant this takes place the supports drop, swinging forwardly, and rest against the cushions $u$, (see Figs. 2 and 3,) which are attached to the sides of the camera-box. The plate-holding cover-like part $c$ (see Fig. 2) then instantly drops, swinging downwardly into the position previously occupied by the ground-glass plate. Its arc is shown in Fig. 6 in the dotted lines. As it nears its lowermost position, it strikes the rear end of the lever *m*, depressing it and throwing its front end sharply upward, stretching the spring *n*. The slotted plate *l* on the forward end of the lever *m*, acting on the pin *k*, then throws the lower end of the lever *g* to the left. (See Fig. 3.) This carries the stud *i* so far to the left that the projection *j* on the edge of the shutter is disengaged from it, and the shutter then makes an entire revolution, exposing the plate to the action of the light; but before the shutter has had time to make its complete revolution the plate has passed beyond the end of the lever *m*, and the spring *n* has retracted the forward end of the lever, so that the plate is held in its position by the rear end of the lever, which passes up in front of it, and also the pivoted lever *g* has been brought back again to its original position by the action of the pin *k* in the slot of the plate *l*, and, this occurring before the shutter has had time to make its complete revolution, the projection *j* comes again in contact with the stud *i* and the shutter rests in that position dark. The apparatus being returned then to its original position and a new plate supplied to the plate-holder, the apparatus is ready for a second use.

It will be seen that my improved plate-holder, which may be made of leather or pasteboard, if preferred, although it may also be constructed of more durable material, is exceedingly light and compact, and is in those respects, I believe, superior to plate-holders ordinarily made, and also that by reason of the tilting of the lens-holding plate or frame an object which under certain circumstances cannot be very well focused may be obtained, although, perhaps, not exactly centered on the ground glass. Nevertheless under certain circumstances this vertical adjustment and tilting of the lens-tube will be found very advantageous.

I do not limit myself to the details of construction described and shown, since it will be apparent to those who are familiar with this art that many alterations may be made therein and still my invention be employed.

I claim—

1. The combination, in a detective camera, of a spring-actuated shutter, a movable ground-glass-holding frame provided with a catch which holds the frame in its forward position in the camera, a swinging frame which holds the sensitive plate, a holding device for the shutter, and a support for the frame of the sensitive plate, constructed and arranged to release the shield and the sensitive plate, respectively, by the rearward movement of the ground-glass-holding frame, substantially as set forth.

2. The combination, in a detective camera, of a spring-actuated shutter, a movable spring-actuated ground-glass-holding frame provided with a catch which holds the frame in its forward position against the action of its spring, a swinging frame for the sensitive plate, a holding device for the shutter, and a support for the frame of the sensitive plate, both engaging with the movable parts of the ground-glass-holding frame and constructed and arranged to release the shield and the frame of the sensitive plate on the rearward movement of the ground-glass-holding frame, substantially as set forth.

3. The combination, in a detective camera, of a spring-actuated shutter, a movable spring-actuated ground-glass-holding frame provided with a catch which holds the frame in its forward position against the action of its spring, a trigger operated from the exterior of the camera, which releases the catch of the ground-glass frame, a swinging frame for the sensitive plate, and a holding device for the shutter and a support for the frame of the sensitive plate, both engaging with the movable parts of the ground-glass frame and constructed and arranged to release the shutter and the frame of the sensitive plate on the rearward movement of the ground-glass frame, substantially as set forth.

4. The combination, in a detective camera, of a spring-actuated shutter, a movable ground-glass-holding frame provided with a catch which holds the frame in its forward position in the camera, a swinging frame which holds the sensitive plate, a holding device for the shutter, and a support for the frame of the sensitive plate constructed and arranged to release the shutter and the sensitive plate, respectively, by the rearward movement of the ground-glass-holding frame, and a stop for the shutter automatically operated by the falling of the sensitive plate, substantially as set forth.

5. The combination, in a detective camera, of a spring-actuated shutter, a movable spring-actuated ground-glass-holding frame provided with a catch which holds the frame in its forward position against the action of its spring, a swinging frame for the sensitive plate, a holding device for the shutter and a support for the frame of the sensitive plate, both engaging with the movable parts of the ground-glass-holding frame and constructed and arranged to release the shutter and the frame of the sensitive plate on the rearward movement of the ground-glass-holding frame, and a stop for the shutter automatically operated by the falling of the sensitive plate, substantially as and for the purposes set forth.

6. The combination, in a detective camera, of a spring-actuated shutter, a movable spring-actuated ground-glass-holding frame provided with a catch which holds the frame in its forward position against the action of its spring, a trigger operated from the exterior of the camera which releases the catch of the ground-glass frame, a swinging frame for the sensitive plate, a holding device for the shutter and a support for the frame of the sensitive plate, both engaging with the movable parts of the ground-glass frame and constructed and arranged to release the shutter and the frame of the sensitive plate on the rearward movement of the ground-glass frame, and a stop for the shutter automatically operated by the falling of the sensitive plate, substantially as set forth.

7. The combination, in a detective camera, of a spring-actuated shutter, a movable ground-glass-holding frame, a swinging frame for the sensitive plate, a holding device for the shutter and a support for the frame of the sensitive plate, both engaging with the movable parts of the ground-glass-holding frame and constructed and arranged to release the shutter and the frame of the sensitive plate on the rearward movement of the ground-glass-holding frame, and a stop for the shutter automatically operated by the falling of the sensitive plate, substantially as set forth.

Signed at New York, in the county of New York and State of New York, this 16th day of June, A. D. 1888.

SYDNEY P. HASEY.

Witnesses:
PHILLIPS ABBOTT,
J. FELBEL.